United States Patent
Gottemoller et al.

(10) Patent No.: US 6,923,155 B2
(45) Date of Patent: Aug. 2, 2005

(54) ENGINE CYLINDER POWER MEASURING AND BALANCE METHOD

(75) Inventors: Paul Gottemoller, Palos Park, IL (US); Keith E. Solomons, Chicago, IL (US); Jerry Van Polen, Oak Park, IL (US); Bradley S. Silvers, Oswego, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/128,201

(22) Filed: Apr. 23, 2002

(65) Prior Publication Data

US 2003/0196633 A1 Oct. 23, 2003

(51) Int. Cl.⁷ .............................................. F02B 77/00
(52) U.S. Cl. ................................................. 123/198 F
(58) Field of Search ...................... 123/198 DB, 198 F, 123/436, 435, 479, 481; 73/117.3, 116, 117.2

(56) References Cited

U.S. PATENT DOCUMENTS 5,709,192 A  * 1/1998  Zimmermann ............. 123/436
5,826,563 A  * 10/1998  Patel et al. ................. 123/481
5,899,189 A    5/1999  Adelsperger et al. ....... 123/436
6,002,980 A    12/1999  Taylor et al. ............... 701/110

FOREIGN PATENT DOCUMENTS

EP   1061246 A2   12/2000
WO   01/61304 A1   8/2001

* cited by examiner

Primary Examiner—Henry C. Yuen
Assistant Examiner—Hyder Ali
(74) Attorney, Agent, or Firm—Cook, Alex, McFarron, Manzo, Cummings & Mehler, Ltd.

(57) ABSTRACT

An accurate method of determining the power developed by selected cylinders of a multiple cylinder engine is based on the concept of controlling engine rpm for test purposes by adjusting the load on the engine instead of controlling speed by adjusting the fuel rate as is commonly done in normal engine operation. The method may be utilized for evaluating cylinder performance and for accurately balancing the output of the individual cylinders. It is particularly useful in railroad applications where the engine operates a generator that produces electric power and the system is provided with dynamic braking grids, which can be utilized as resistor grids for load testing the engine. However, the method is also applicable to other engines and other engine arrangements where engine power may be absorbed by a generator or dynamometer for controlling the load for test purposes.

10 Claims, 1 Drawing Sheet

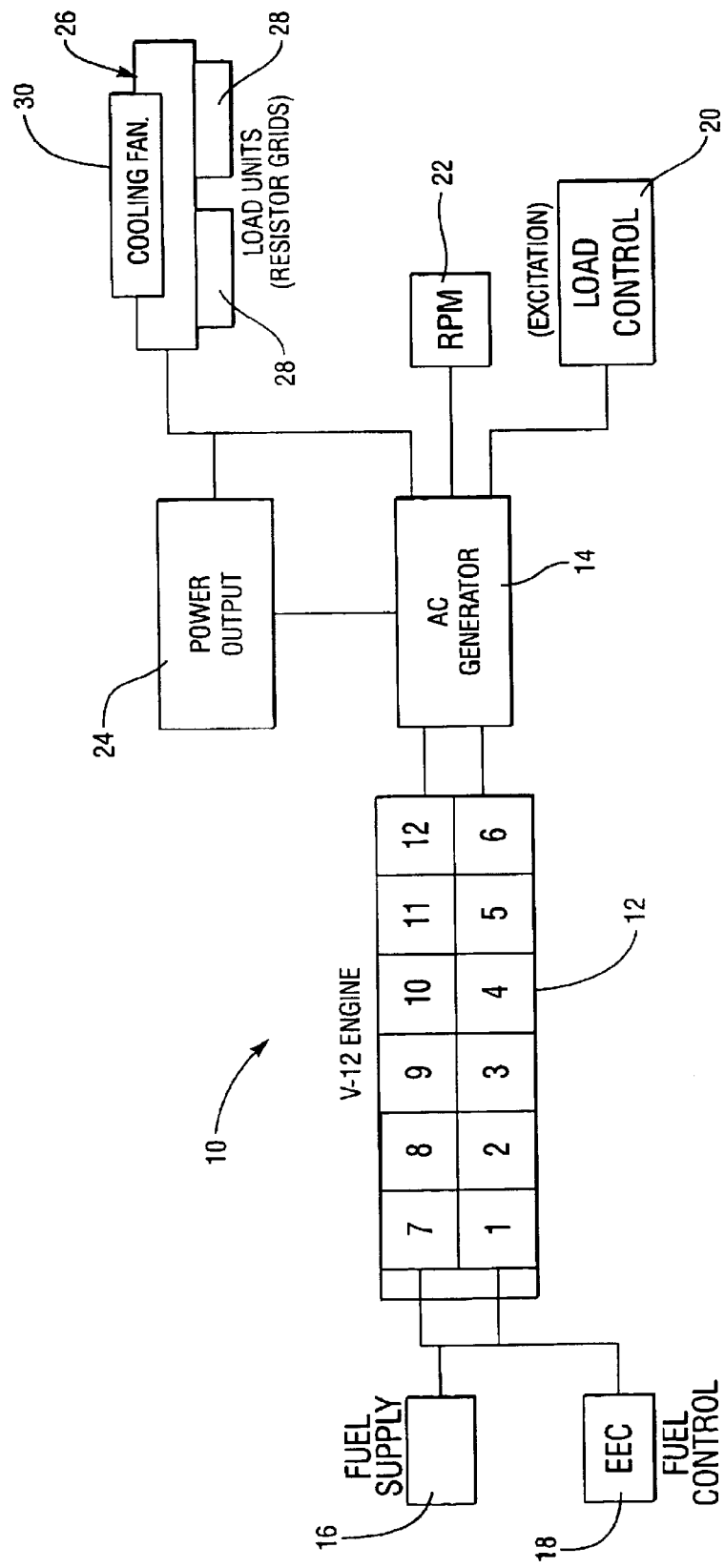

ENGINE CYLINDER POWER MEASURING AND BALANCE METHOD

TECHNICAL FIELD

This invention relates to multi-cylinder engines and, in particular, a method for measuring power developed by the individual cylinders of an engine and for balancing the cylinder output.

BACKGROUND OF THE INVENTION

In the operation of multi-cylinder diesel engines, such as, for example, locomotive engines which may have 12, 16, or even 20 cylinders, it is sometimes difficult to determine if an individual cylinder is not firing or is producing too little or too much power. Attempts to determine this by shutting off fuel to one of the cylinders and observing how much the length of the injection period is changed on the remaining cylinders has produced inconsistent results because the change in the length of injection duration has been small compared to the adjustments being made to maintain engine rpm. In other words, the relatively small fuel rate changes required in the remaining operating cylinders are not easily accurately measured so that the power of the non-operating cylinder is not accurately determined. As a result, a more satisfactory method was desired.

SUMMARY OF THE INVENTION

The present invention provides a more accurate method of determining the power developed by one or more selected cylinders of a multiple cylinder engine. The method is based upon the concept of controlling engine rpm for test purposes by adjusting the load or power developed by the engine instead of accomplishing speed control by adjusting the fuel rate as is commonly done in operating the engine.

The method is particularly applicable to and useful in railroad applications and similar applications where the engine operates a generator which produces electric power and the system is provided with dynamic braking grids which can be utilized as resistor grids for load testing the engine. However, the method is also applicable to other engines and other engine arrangements where the engine power may be absorbed by a generator or dynamometer by which the load placed on the engine may be controlled for test purposes.

In accordance with the invention, a method for determining the power output of selected cylinders of a multi-cylinder engine comprises:

operating the engine at a selected speed and fuel rate for all cylinders and controlling the engine speed by varying the load on the engine;

measuring a first engine power output with the engine operating at the selected speed with all cylinders powered;

shutting off the fuel to the selected cylinders and maintaining the selected engine speed by reducing the load on the engine;

measuring a second engine power output with the engine operating at the selected speed with the selected cylinders unpowered; and determining the difference between the first and second measurements, which equals the power produced by the selected cylinders during the first engine power output measurement.

If a single cylinder is selected for testing, the power produced by that cylinder is directly determined by the difference between the first and second measurements. Alternatively, two or more cylinders could be shut off at one time and the test could be repeated with various combinations of cylinders. The individual cylinder results could then be determined by comparison of the various readings to indicate the power produced by each of the cylinders.

The method is useful for determining whether a cylinder is performing properly or whether some repairs may be needed. The method may also be utilized for accurately balancing the output of the individual cylinders of the engine by testing the cylinders as previously indicated and adjusting the period of fuel injection of each cylinder as necessary to obtain a cylinder power output equal to a desired engine output divided by the number of engine cylinders. When these steps have been repeated for each of the cylinders, the output of all the engine cylinders should be essentially equal.

In an engine wherein the fuel injection is electronically controlled by pulse width modulation or another method of controlling the time of injection, the period of fuel injection into a cylinder may be adjusted by adjusting the pulse width or injection rate of each of the cylinder injectors separately in order to obtain the desired power output of each individual cylinder.

Use of the present invention to check for improperly operating cylinders and to periodically rebalance cylinder power output can be effective to:

eliminate cylinder to cylinder power variations;

detect cylinders not firing or with low or high power output;

reduce NOx and hydrocarbons from overloaded cylinders; and improve fuel economy.

These advantages may be accomplished with only software modifications to existing hardware in current model locomotives.

These and other features and advantages of the invention will be more fully understood from the following description of certain specific embodiments of the invention taken together with the accompanying drawings.

BRIEF DESCRIPTION OF THE DRAWINGS

The single FIGURE of the drawing is a diagram illustrating the significant engine, control and power distribution components utilized in the method of the present invention as applied, for example, in a railway locomotive.

DESCRIPTION OF THE PREFERRED EMBODIMENT

Referring now to the drawing in detail, numeral 10 generally indicates pertinent portions of a power unit as applied to a railroad locomotive of the type currently found in road service on many railroads. Power unit 10 includes a 12 cylinder V-type diesel engine 12 which is connected to directly drive an AC generator 14. The output of the generator is converted to DC which, in some locomotives, is directly applied to traction motors, not shown, for driving the engine in normal service. In other locomotives, the DC power is again converted to variable frequency AC power for use in driving AC traction motors of a locomotive, also not shown. The engine is provided with a pressurized fuel supply 16 which is supplied to individual injectors, not shown, that inject the fuel at high pressure into the individual cylinders 12 of the engine. An electronic engine control 18 operates to control the fuel injected by the individual injectors by varying the time of injection through electronic pulse width modulation.

The output of the AC generator is controlled by an excitation control or load control 20 which varies the field excitation of the generator in order to vary the load placed on the engine. The engine rpm is shown by an indicator 22 and the engine power output is shown by a power readout 24.

Railroad load locomotives are commonly supplied with a dynamic brake hatch 26 which includes a plurality of electric resistor grids 28 mounted below a plenum connected with a cooling fan 30. In operation, the fan draws air through the resistor grids 28 to cool them when the engine is operating in the dynamic brake mode. In this mode, the locomotive traction motors act as generators for slowing the speed of the train while the power developed in the traction motors is dissipated in the grids 28 of the dynamic brake hatch. The dynamic brake hatch 26 is also commonly utilized for loading the engine of the locomotive during regular load tests in which the engine performance is determined. In locomotives which do not have a dynamic brake hatch, load tests may be performed by hooking the generator of the locomotive up to separate load test boxes which operate similarly to the dynamic brake hatch.

In normal engine operation, the engine speed is controlled by an operator who adjusts an engine throttle to obtain pre-set governor controlled engine speeds and corresponding loads. These are established by control of excitation by the load control 20 and control of fuel injection by the electronic engine controller 18. Normally the load control for each throttle position is set to provide a specified excitation level for each engine speed and the engine speed is controlled by varying the fuel supplied to the engine cylinders in response to a governor, not shown, driven by the engine.

In carrying out the present invention, the system is reconnected in the manner shown in the drawing so that the power output of the AC generator is converted to DC and delivered directly to the resistor grids 28 in the dynamic brake hatch 26. In conducting the load test, the engine is first operated at a selected speed, such as maximum speed, and a selected fuel rate, such as that normally utilized for operating at the selected speed and the load which corresponds to that speed, to obtain the operating power of the engine under the test conditions. A first engine power output measurement is indicated by the readout 24, and the engine rpm is indicated by the indicator 22.

With the engine operating at this selected speed and fuel rate, the fuel rate of each of the cylinders is fixed and the engine speed is thereafter controlled by varying the excitation on the generator with the load control 20. Fuel to a selected cylinder or cylinders is then shut off so that the power developed by the engine is reduced. However, engine speed is maintained by reducing the load on the engine so that operation of the engine at the selected speed is continued.

Thereafter, a second engine power output measurement is taken with the engine operating at the selected speed but with the selected cylinder or cylinders unpowered. The difference between the first and second power measurements is then determined and this difference equals the power which was produced by the selected cylinder or cylinders when they were operated normally during the first engine power output measurement.

Ideally, if a single engine cylinder is shut off, this power output should equal the total output of the engine divided by the number of cylinders which, in the instance indicated, is 12. Therefore, the resulting power indicated for the single cylinder may be determined as being above or below the ideal power output by whether it is above or below $1/12$ of the desired engine output for the engine operating conditions tested. Accordingly, the condition of operation of the cylinder may be determined and, if needed, any adjustments or repairs indicated as being needed by the engine may be made.

If it is desired to balance equally all the engine cylinders to provide essentially equal power from each cylinder, the cylinders may be tested individually or in selected groups from which the power produced by each cylinder may calculated and adjusted by controlling the fuel injected by the respective injectors to obtain the desired portion, in this case $1/12$, of the desired power output of the engine. The testing and adjustment steps are repeated for the selected cylinders until all the cylinders are operating with equal power output and the engine cylinders are then balanced.

In the case of pulse width modulation of electronically-controlled injectors, the balancing process may be conducted by setting the engine controller to adjust the pulse width of each of the individual cylinders as necessary to obtain the balanced cylinder output condition.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A method for determining the power output of selected cylinders of a multi-cylinder engine, the method comprising:
    operating the engine at a selected speed and fuel rate for all cylinders and controlling the engine speed by varying the load on the engine;
    measuring a first engine power output with the engine operating at the selected speed with all cylinders powered;
    shutting off the fuel to the selected cylinders and maintaining the selected engine speed by reducing the load on the engine;
    measuring a second engine power output with the engine operating at the selected speed with the selected cylinders un-powered; and
    determining the difference between the first and second measurements, which equals the power produced by the selected cylinders during the first engine power output measurement.

2. A method as in claim 1 wherein a single cylinder is selected to be shut off and the difference in the first and second measurements equals the power produced by the single cylinder during the first engine power output measurement.

3. A method as in claim 1 including repeating the steps of shutting off the fuel to the selected cylinders and measuring a second engine power output with various combinations of cylinders shut off until sufficient data is obtained for mathematically determining the power output for all the selected cylinders.

4. A method as in claim 1 wherein the fuel rate for each cylinder is electronically controlled by adjusting a period of fuel injection for the cylinder, and further comprising:
    adjusting the period of fuel injection of the selected cylinder to obtain a cylinder power output equal to a desired engine output divided by the number of engine cylinders; and repeating the foregoing steps with various engine cylinders to balance the power output of all the cylinders.

5. A method as in claim 4 wherein the period of fuel injection into a cylinder is adjusted by adjusting the solenoid actuating pulse timing of an actuating current for a solenoid actuated injector.

6. A method of determining power output of selected cylinders of a multi-cylinder engine in a railway locomotive having a generator with a DC output adjustable by varying field excitation and connectable with resistor grids for load testing, the method comprising:

connecting the generator with the resistor grids for load testing;

operating the engine with a fixed fuel rate at a selected speed and load controlled by varying the generator field excitation;

measuring a first engine power output at the selected speed;

shutting off fuel to the selected cylinders while maintaining the selected speed by reducing engine load through varying generator field excitation;

measuring a second lower engine power output at the selected speed with the selected cylinder unpowered; and determining the difference between the first and second power output measurements, which equals the power produced by the selected cylinders during the first engine power output measurement.

7. A method as in claim 6 wherein a single cylinder is selected to be shut off and the difference in the first and second measurements equals the power produced by the single cylinder during the first engine power output measurement.

8. A method as in claim 6 including repeating the steps of shutting off the fuel to the selected cylinders and measuring a second engine power output with various combinations of cylinders shut off until sufficient data is obtained for mathematically determining the power output for all the selected cylinders.

9. A method as in claim 6 including:

adjusting the fuel rate for the selected cylinders to obtain a power output equal to the desired engine output divided by the number of engine cylinders; and repeating the previous steps with various engine cylinders to balance the power output of the engine.

10. A method as in claim 9 including adjusting the fuel rate for each selected cylinder by adjusting the pulse timing of an actuating current for an associated solenoid actuated fuel injector.

* * * * *